Feb. 7, 1967 A. V. HAEFF 3,303,276

LIGHT BEAM DEFLECTOR AND RELATED SYSTEMS

Filed Feb. 26, 1964 5 Sheets-Sheet 1

INVENTOR
ANDREW V. HAEFF

BY Fraser and Bogucki

ATTORNEYS

INVENTOR
ANDREW V. HAEFF
BY Fraser and Bogucki
ATTORNEYS

INVENTOR.
ANDREW V. HAEFF
BY Fraser and Bogucki
ATTORNEYS

LIGHT BEAM DEFLECTOR AND RELATED SYSTEMS

Filed Feb. 26, 1964 5 Sheets-Sheet 4

INVENTOR.
ANDREW V. HAEFF
BY Fraser and Bogucki
ATTORNEYS

INVENTOR.
ANDREW V. HAEFF
BY Fraser and Bogucki
ATTORNEYS

United States Patent Office 3,303,276

Patented Feb. 7, 1967

3,303,276

LIGHT BEAM DEFLECTOR AND RELATED SYSTEMS

Andrew V. Haeff, 11134 Belliagio Road, Los Angeles, Calif. 90049

Filed Feb. 26, 1964, Ser. No. 347,586

20 Claims. (Cl. 178—5.4)

This invention relates to a signal operated light beam deflection system capable of operating at relatively high frequencies, such as the scanning frequencies used in modern television systems.

Presently, there are no practical systems capable of significantly deflecting a light beam in response to high frequency deflection signals. Accordingly, television systems, oscilloscopes and the like require cathode-ray tubes, wherein the deflection of an electron beam may be precisely controlled at almost any desired frequency by signal voltages applied to magnetic or electrostatic horizontal and vertical deflection devices.

Cathode-ray tubes, while performing adequately, are often the highest cost and the most bulky single element of oscilloscope and television receiver systems. A conventional cathode-ray tube is relatively complex and difficult to fabricate correctly. Each tube must contain an electron gun, accelerating electrodes, focusing electrodes and vertical and horizontal deflection means, all precisely aligned and vacuum sealed within the air tight glass tube. Moreover, since the electron beam is not itself visible, a phosphorous coating must be applied to the inner surface of the tube face so that the electron beam may be converted into visible light.

Furthermore, the tube is usually made of glass. Accordingly, should the tube break, or should any of the numerous elements within become damaged or otherwise inoperable, repairs are all but impossible. Even a slight defect in one tube element may require an entirely new tube since access to the interior necessitates destroying the vacuum enclosure.

In contrast, light beam deflection systems capable of operating with the desired precision and frequency would possess distinct advantages over present cathode-ray tubes since the abovementioned problems would be avoided. A light beam can be obtained from a low cost, easily replaceable light source, operating at relatively low voltage. Moreover, the viewing screen, instead of requiring a phosphorous coating (except in special arrangements to be described later) could be easily and cheaply fabricated from any light diffusing material. A fluorescent coating may be applied to the face of the viewing screen only if a finite glow period is desired. Furthermore, by use of the light beam instead of an electron beam, there is no need for enclosing the different elements within a single evacuated tube; the light beam source, the vertical and horizontal deflection device, and the viewing screen may be mounted separately to permit easy replacement or repairs should one or more elements become inoperable.

Improved color television systems are possible through use of light beam deflection systems, such as described herein in accordance with the present invention. Present commercially available color television systems employ a picture tube having three separate electron guns, one for each primary color. An orderly array of small closely spaced phosphor dots, usually arranged in triangular groups, are accurately deposited in interlaced positions on a supporting glass surface. Each triangular array consists of a green emitting dot, a red emitting dot, and a blue emitting dot. A shadow mask located closely adjacent and parallel to the dot supporting glass surface provides color separation by shadowing two of the three phosphor dots in each array from two of the electron beams, while exposing the third to electron bombardment by the proper beam when the system is properly aligned. In order to obtain properly colored television pictures, the phosphor dots must be carefully deposited on the supporting glass surface, and the very minute holes in the shadow mask carefully aligned with the phosphor dot array. Also, each of the three electron guns must be carefully positioned and the beams deflected to converge at a single point on the shadow mask in a proper angular relation. Accordingly, a color television tube is much more complex, and thus more expensive and unreliable, than the cathode-ray tubes used for "black and white" television.

On the other hand, with a light beam deflection system in accordance with the invention, color television capabilities can be achieved simply by adding two light sources to the basic system used for "black and white" reception. Each light beam has a different color corresponding to the desired primary colors, that is, red, blue and green in accordance with present standards. All three colored beams can then be deflected by the same beam deflection units to scan a light diffusing or fluorescent viewing screen. The great simplicity of such systems, as contrasted to the present color television receiver systems, greatly reduces the costs of high quality color television reception.

Therefore, it is an object of the present invention to provide an improved light beam deflection system.

Another object of the present invention is to provide a light beam deflection system for precisely positioning light beams in response to electrical signals.

A further object of the present invention is to provide a light beam deflection system for precisely deflecting a light beam in response to electrical signals having frequencies in the order of 30,000 cycles or more.

A further object of the present invention is to provide an improved light beam deflection system for horizontally and vertically scanning the viewing screen in response to electrical control signals.

Yet another object of the present invention is to provide an improved, low cost system for visually representing applied electrical signals on a viewing screen without using a cathode-ray tube, but operating in a manner similar to present cathode-ray systems.

Still another object of the present invention is to provide improved, simple and low cost color television systems compatible with the present day television transmission standards.

These and other objects are accomplished in accordance with the invention by use of a novel light beam deflection unit consisting of a series of small refracting prisms, each prism being formed by a flat transparent plate separating two liquids of different refractive index. The flat transparent plates, which may be fabricated of a glass or plastic material, are positioned parallel to each other and aligned along the beam path. Each plate is supported by the thin flexible walls of a supporting structure completely separating the two liquids so that every other space between adjacent plates is filled with one liquid and the alternate spaces filled with the other. Part of the structure used in containing the two liquids consists of a piezoelectric crystal device similar to the commonly known bimorph crystal, which flexes in one direction or the other depending upon the polarity of an applied deflection voltage and by an amount depending upon the amplitude of the deflection voltage. Each of the liquids completely fills its respective portion of the containing structure to provide two nearly incompressible liquid volumes communicating with the surfaces of the bimorph crystal device. When a deflection voltage is applied to the bimorph crystal device, it flexes to expand one liquid volume and compress the other. However, since the two volumes are substantially incompressible a differential volume change produces a displacement of the liquid separating walls through flexing of the thin walls supporting the transparent plates. By properly positioning the prism plates on the thin flexible membranes or walls, as the walls of the supporting structure flex, adjacent plates become angularly displaced relative to one another by an amount proportional to the applied deflection voltage, thus effectively changing the prism angle. Accordingly, each prism in the series is able to refract an incident light bean by a small angle.

Whereas the angular displacement of each pair of adjacent plates may be quite small, the total deflection angle provided by the multiplicity of elements of the light beam deflection unit in accordance with the invention may be relatively large, because of additive effects so that the small angle of refraction produced by each individual prism is multiplied by the total number of prisms in the series. Each prism has a refractive effect which is proportional to the difference between the indices of refraction of the two liquids on opposite sides of the plates.

The frequency response of such light beam deflection units is wholly dependent upon the transverse dimensions of the particular unit, that is, the total distance between the base of the bimorph crystal and the transparent plates and upon the velocity of sound in the liquid, which depends upon the density and the compressibility of the liquid. As illustrated and described herein, such light beam deflection units can be constructed with overall transverse dimensions permitting very fast response corresponding to cut-off frequencies greater than 30,000 cycles.

In accordance with one aspect of this invention, two such light beam deflection units may be placed in series, one to control the horizontal deflection angle and the other the vertical deflection angle of an incident beam. In this manner, the beam may be deflected in accordance with horizontal and vertical deflection signals to sweep across a desired area in a regular scanning pattern. In accordance with this aspect of the invention, the beam may be deflected to scan a viewing screen while the intensity of the beam is modulated by a picture signal. In this manner, television live signal or stored record may be presented for viewing without using the conventional cathode-ray picture tubes.

In accordance with another aspect of this invention, color television signals, live or recorded, can be presented for viewing by means of a simplified less costly compatible color television system. This system contains three separate light beam sources, each light beam having a color corresponding to a separate one of the primary colors red, blue or green, and each being modulated in accordance with a respective color signal derived from the composite color signal by conventional receiver circuits. The three beams are aligned closely parallel to one another to pass through the horizontal and vertical deflection units to be scanned across the viewing screen area in response to horizontal and vertical deflection voltages generated in the conventional manner. Since the light beams themselves contain the primary colors, the viewing screen may consist of a simple white light diffusing surface, thereby avoiding use of the complex phosphor dot and shadow mask arrangement necessary with present picture tubes.

These and other aspects of the invention are better understood from a consideration of the following detailed description taken together with the accompanying drawings, in which.

Figure 1:
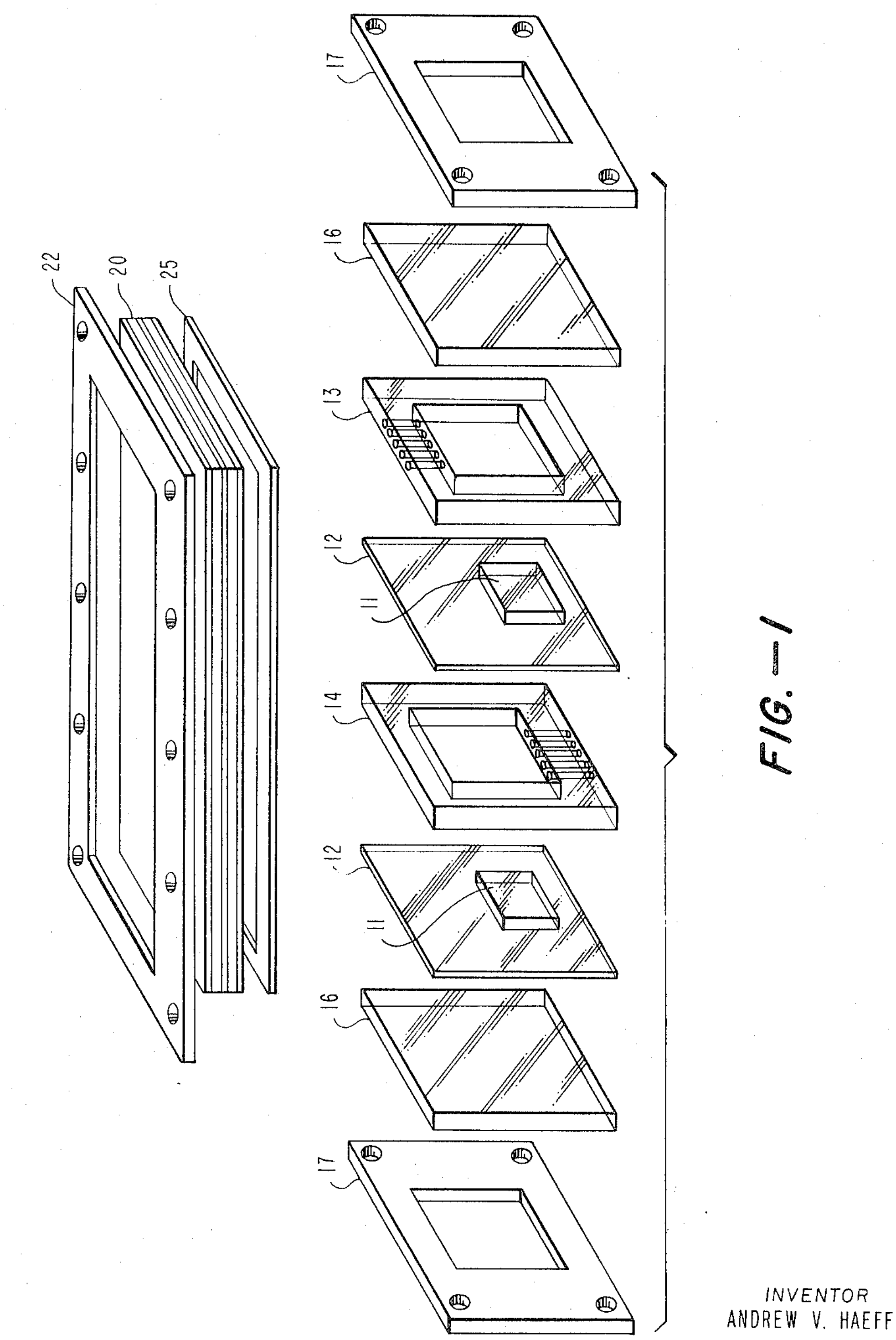
FIG. 1 is a partially exploded view, in perspective, of a preferred form of a signal operated light beam deflection unit in accordance with the invention.
Figure 3:
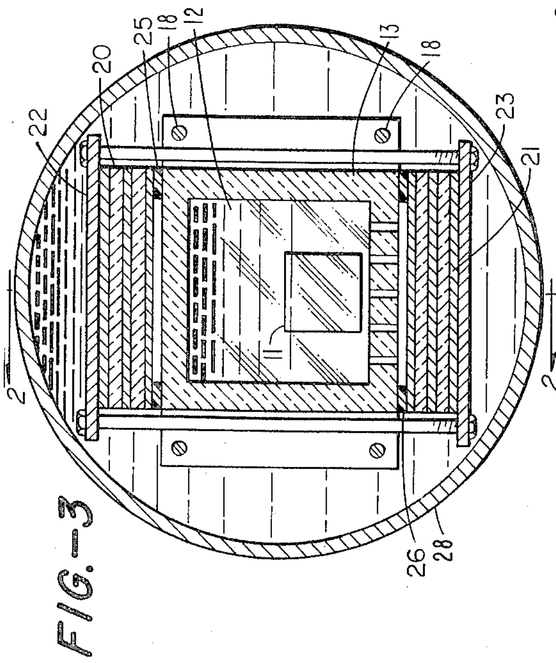
FIG. 3 is an end view in full section of the light beam deflection unit shown in FIG. 2, the section being taken along the line 3—3 of FIG. 2.
Figure 2:
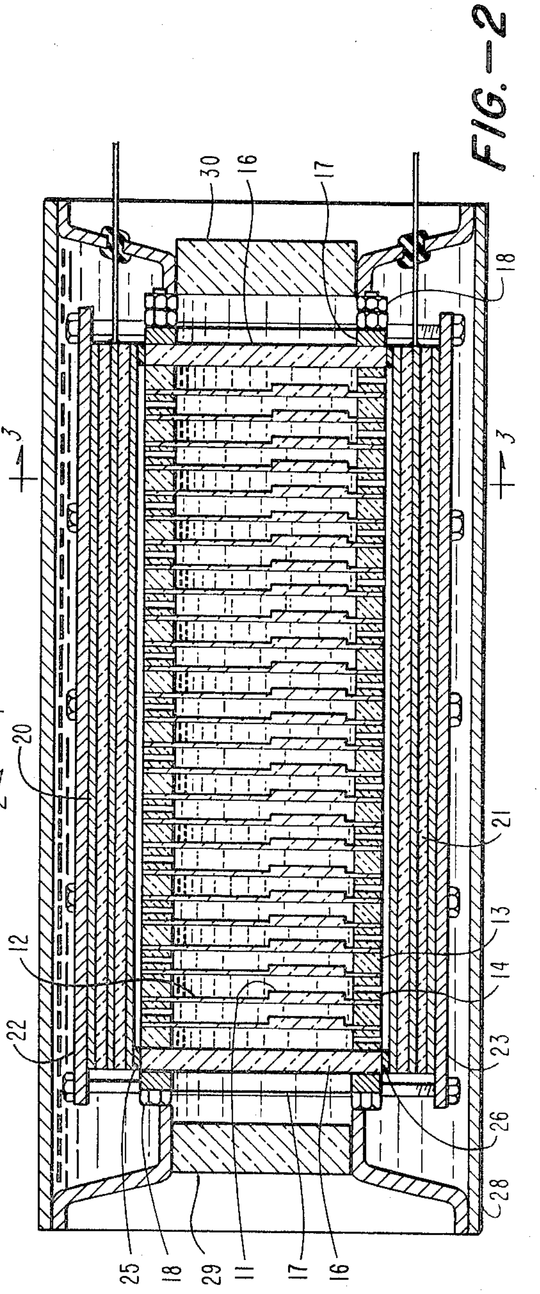
FIG. 2 is a full side sectional view of the preferred form of the signal operated light beam deflection unit assembled in accordance with the invention, the section being taken along the line 2—2 of FIG. 3.

Referring now to FIGS. 1, 2 and 3, there is illustrated a preferred embodiment of a light beam deflection unit in accordance with the invention, which facilitates fabrication and assembly of a unit having any desired number of refracting prisms in series. It should be understood that the dimensions of certain elements have been exaggerated for ease in illustration. In the assembled unit, each refracting prism has a thick transparent plate 11 separating two liquids having substantially dissimilar indices of refraction. Each plate 11 is mounted rigidly within an opening provided in, or formed as a part of a thin flexible membrane 12. The plates 11 are centered with respect to one of the transverse dimensions of the membrane 12, but lie substantially to one side of the center line of the other transverse dimension. Accordingly, as the membrane 12 is flexed, the plate 11 is tilted in one direction or the other depending upon the direction of flexing.

Each membrane 12 is supported between oppositely oriented rigid rectangular spacers 13 and 14. The spacers 13 and 14 are similarly constructed having rectangular central openings for separating the protruding faces of plates 11 so that adjacent plates will not touch as the membranes flex. Each spacer 13 and 14 contains one or more pressure holes extending from one edge to the central opening. While the spacers 13 and 14 are constructed identically, they are oriented so that the pressure holes of one type are opposite the pressure holes of the other type. As viewed in the drawings, the spacers 13 are disposed on one side of each membrane 12 with the pressure holes extending vertically through the upper portion from the upper edge to the central opening, whereas the spacers 14 from the opposite side of each membrane are upside down, that is, with the pressure holes extending vertically through the lower portion from the bottom surface to the central opening. Accordingly, the pressure holes in the spacer 13 permit liquid pressure from above to be transmitted to the central opening and the adjacent plastic membranes 12, while the pressure holes at the bottom of the spacers 14 permit pressure from below to be transmitted to the central opening.

The desired number of membranes 12 with the different type spacer 13 and 14 on opposite sides are assembled in a series, as shown in FIGS. 2 and 3. The plates 11 are arranged parallel to one another and aligned along the desired beam path. Flat transparent end plates 16 having the same outer transverse dimensions as the spacers 13 and 14 are added at each end. The resulting stack is clamped tightly between a pair of metal clamping members 17. Bolts 18, which extend the length of the stack to engage holes provided in the clamping members 17, are tightened to produce the necessary clamping force for ensuring a good liquid seal between the adjacent contacting surfaces of the different elements in the stack. With the stack thus assembled, a properly directed light beam entering through a central aperture in the clamping member 17 at one end of the stack will emerge from the central aperture in the clamping member 17 at the other end of the stack after passing through each plate 11 in the series and the two end plates 16.

Piezoelectric crystal devices 20 and 21, similar to bimorph crystals, are attached one above and the other below the assembled stack. The bimorph crystal devices 20 and 21 each consits of two barium titanate or lead zirconate crystals polarized in opposite directions, with the two crystals being separated by a middle electrode and having two normally grounded outer electrodes on either side. When a deflection voltage is applied to the middle electrode, the bimorph crystal device 20 or 21 responds by flexing in one or the other directions depending upon the polarity of the applied deflection voltage and by an amount proportional to the amplitude of the deflection voltage. Both bimorph crystal devices 20 and 21 can be made flat and have surface dimensions corresponding to the areas of the upper and lower stack surfaces. The two bimorph crystal devices are attached by means of metallic upper and lower crystal clamping members 22 and 23, both of which have a central rectangular aperture to permit flexing of the flat bimorph crystal devices in either direction. Bolts extending vertically between the upper and lower crystal clamping members 22 and 23 exert the clamping force needed for a proper liquid seal at the edges of the crystals at the top and bottom of the stack. Upper and lower Teflon (for example) gaskets 25 and 26 may be used as shown to improve the liquid seal between the associated crystal and the adjacent stack surface. The attached bimorph crystal devices 20 and 21 complete the enclosure of separate volumes within the assembly, which is then mounted within a closed cylindrical container 28. When properly mounted, the plates 11 are aligned between liquid sealed transparent entrance and exit windows 29 and 30, respectively, located on opposite ends of the container 28.

The two enclosed volumes within the assembly are then filled with two liquids having substantially dissimilar indices of refraction. One liquid fills the enclosed volume including the central openings in the spacers 13, and the other liquid fills the other enclosed volume including the central openings in the spacers 14. In addition, the respective liquids fill the pressure holes and any space between the surface of the associated bimorph crystal devices 20 or 21 and the stack, so that two separate and substantially incompressible liquid volumes are formed within the assembly, one for each type spacer. Accordingly, as the upper bimorph crystal 20 flexes, a pressure change is transmitted with the velocity of sound from the crystal surface through one liquid and through the pressure holes in the spacers 13 to one side of the adjacent flexible diaphragms 12. Likewise, as the lower bimorph crystal 21 flexes, a pressure change is transmitted from its surafce through the other liquid and through the pressure holes in the spacers 14 to the opposite sides of the diaphragms 12.

The deflection voltages applied to control the flexing of the bimorph crystal devices 20 and 21 are obtained from an appropriate deflection voltage generating circuit (not shown). The crystal devices 20 and 21 are connected to receive these deflection voltages and respond in such a manner that one crystal flexes to compress its associated liquid volume as the other flexes to expand its associated liquid volume. Since the liquids used are practically incompressible, this flexing of the bimorph crystal devices 20 and 21 actually displaces a differential volume of liquid by flexing the diaphragm 12, thus changing the angular relation between adjacent thick plastic plates 11.

For example, two diaphragms 12 adjacent one type spacer are subjected to a lower pressure in the liquid between them and a higher pressure in the other liquid on either side, and thus flex inward so that the tops of the adjacent plates 11 move slightly inward toward one another. On the other hand, when the internal pressure between two adjacent diaphragms 12 is greater, the tops of the two adjacent plates 11 angle slightly outward to change the prism angle, a light beam is thus refracted in one direction or the other, depending on the direction of flexing, as it passes through the interfaces between the two liquids forming the series of prisms.

A positive coupling between the exterior faces of the upper and lower crystals 20 and 21 can be achieved by filling the entire cylindrical container 28 with an appropriate liquid, such as water. Since this liquid is also substantially incompressible, the flexing of one crystal must be balanced by the opposite flexing of the other. In addition, cavitation effects on both sides of the crystals can easily be prevented by simply pressurizing the liquid filling the container 28 to ten atmospheres, for example. The high pressure forces, which are otherwise balanced, need only be withstood by the container walls and by the entrance and exit windows 29 and 30, which of course are mounted and sealed to withstand such pressures.

As previously stated herein, the two liquids separated by the flexible diaphragms 12 should have substantially dissimilar indices of refraction. For example, carbon disulfide, which has an index of refraction of 1.63, may be used with water, which has an index of refraction of 1.33. A light beam passing from one liquid to the other is refracted at the interface through an angle roughly proportional to the difference in the refractive indices and directly proportional to the prism angle. Therefore, when the diaphragms 12 are flexed in one direction or the other, the incident light beam refracted at the interface between the two liquids is deflected through an angle proportional to the tilt angle of the plates 11. Whereas the angle of refraction at each interface may be very small, the total deflection angle of the emerging beam is multiplied by the number of plates 11 in the stack. Accordingly, the total deflection angle may be increased by either increasing the number of plates 11 or by using liquids having a greater difference between their indices of refraction. The liquids chosen must however be substantially colorless to prevent undue absorption or scattering of the beam.

A certain amount of the incident light tends to be reflected at the interfaces. By selecting one liquid having an index of refraction matching that of the material used by the plates 11, this reflection can be minimized. For example, the refractive index of carbon disulfide closely matches that of some glass compositions. Of particular interest, methylene iodide has a large refractive index of 1.70 and may be diluted with other liquids of lower refractive index so that the resulting index matches that of the plate material. In addition, as is well known in the art, the faces of the plates 11 may be coated with a quarter wave film as a means of further preventing reflections.

Whereas the liquids employed may be described as substantially incompressible, the pressure variations caused by flexing of the crystals 20 and 21 travel at a finite velocity equal to the speed of sound in the liquid. Therefore, the frequency response of a deflection unit in accordance with the invention is dependent upon the total distance measured from the face of the bimorph crystal 20 or 21 through the shortest liquid path to the plates 11. For proper response, this distance should be maintained less than a quarter wave length in the fluid at the maximum desired operating frequency. Because of the small cross section of the beam the transverse dimensions of the liquid filled portions within the stack may be kept very small so that a deflection unit in accordance with this invention may easily be constructed to operate nearly linearly up to frequencies in the order of 30,000 cycles or more. Moreover, the total angle of beam deflection is proportional to the amplitude of the applied deflection voltage as long as the elastic limit of the diaphragms 12 is not exceeded.

It may be seen that the transparent plates, diaphragms and spacers may be conveniently fabricated by conventional methods from glass or plastic materials, and assembled with relative ease to provide a deflection unit having a desired total deflection angle. Each plate 11 with the supporting diaphragm 12 may be cast or stamped as a single unit, and the surfaces of the plate 11 polished or otherwise treated to obtain the desired optical properties. The spacers 13 and 14 may be cast with the pressure holes, or may first be stamped as a solid unit with the holes drilled later.

Figure 4:
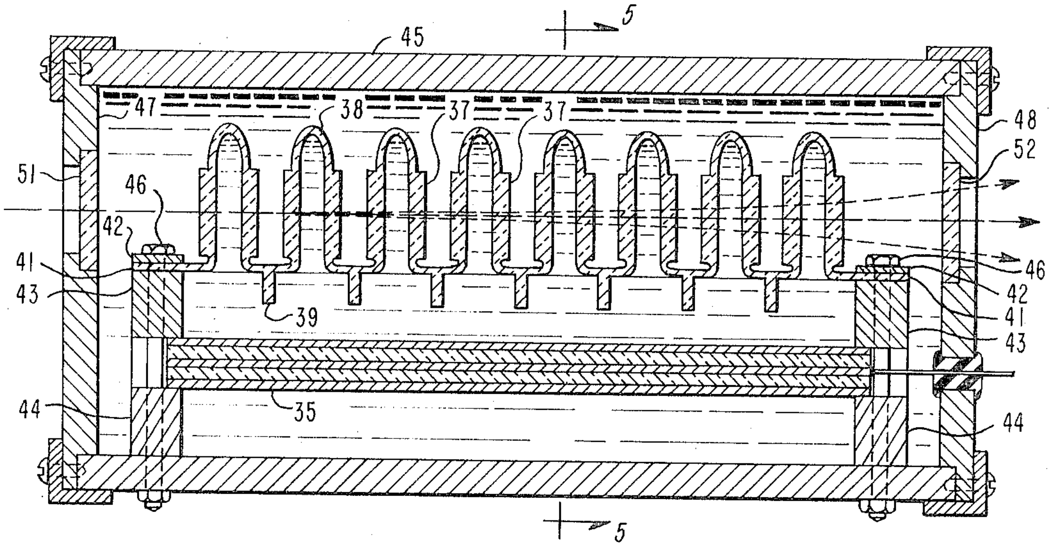
FIG. 4 is a full side sectional view of an alternative emodiment of a signal operated light beam deflection unit in accordance with the invention, the section being taken along the line 4—4 of FIG. 5.
Figure 5:
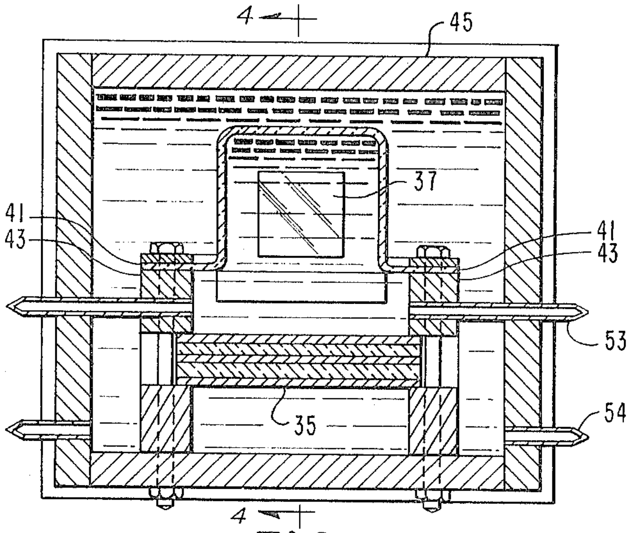
FIG. 5 is a full end sectional view, the section being taken along the line 5—5 of FIG. 4.
Figure 6:
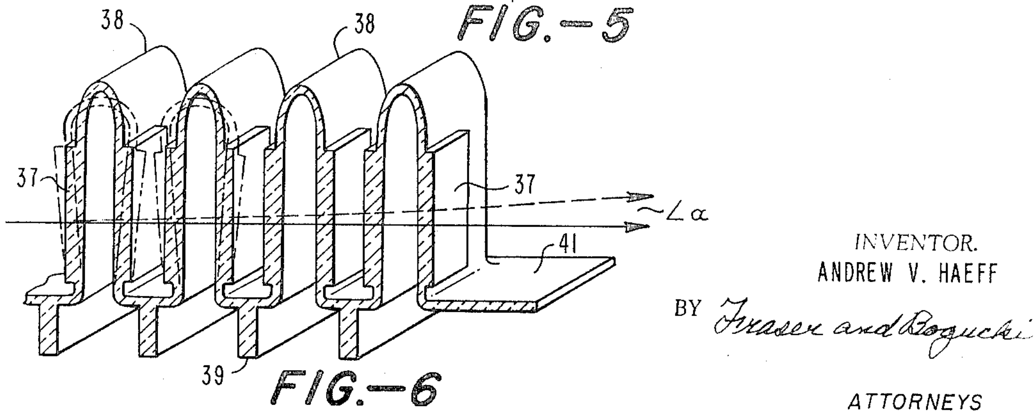
FIG. 6 is a perspective view of a broken away portion, shown partially in section, of the plate supporting structure used in the embodiment of FIGS. 4 and 5.

Referring now to FIGS. 4, 5 and 6, there is shown an alternative embodiment of the light beam deflection unit in accordance with the invention employing only a single bimorph crystal 35. In this embodiment, a series of transparent plates 37 are held by a thin wall supporting structure, which separates the two liquid systems. Preferably, the plates 37 are formed as an integral part of the supporting structure so that it may be fabricated by a single glass or plastic molding. The supporting structure has thin flexible upper sections formed in a narrow arch to join the tops of alternate pairs of adjacent plates 37 in the series. The lower portion of the supporting structure consists of a thick rigid portion 39 attached by a thin flexible extension to the bottom of the other alternate pairs of adjacent plates 37. Pressure differentials generated in the two liquid systems by flexing of the bimorph crystal 35 causes the flexible, narrow arches forming the upper sections 38 of the supporting structure to expand or contract, as shown in the dotted lines in the detailed illustration of FIG. 6. The narrow flexible portions at the bottom of the supporting structure bend to permit the plates 37 to tilt as the upper section expands or contracts.

The plate supporting structure is formed with flanges extending outward to be clamped between upper and lower rectangular shaped clamping members 42 and 43, to thereby form one portion of a liquid tight seal between the two liquid volumes. The single bimorph crystal 35 is clamped between the lower rectangular clamping member 43 and a rectangular mounting member 44, which extends upward from the bottom side wall of an outer container 45. Bolts, 46, extending through the clamping member 42 and 43 and the supporting member 44 to the exterior of the container 45 may supply the necessary clamping force for a liquid tight seal. The mounting member 44 joins the body of the container 45 only at the two ends, leaving an open side portion through which the lower face of the crystal 35 is coupled by the shortest possible liquid path to the upper sections 38 of the plate supporting structure.

The side walls of the container 45 have end plates 47 and 48 attached to complete the enclosure. The very stiff end plates 47 and 48 contain entrance and exit windows 51 and 52 through which a light beam can enter and leave a deflection unit. The series of plates 37 are aligned along the path of the light beam from the entrance window 51 to the exit window 52. Of course, it should be understood that the end plates 47 and 48 may be attached to the stiff side wall structure of the container 45 by any conventional means, such as the clamps shown herein, which produces a liquid tight closure capable of withstanding the pressure within the deflection unit.

The deflection unit may contain liquid filling tubes 53 and 54 extending through the side walls 45 of the container to permit filling of the two liquid volumes after assembly. A liquid such as carbon disulfide is supplied through the filling tube 53 to fill the volume between the upper surface of the bimorph crystal 35 and the plate supporting structure. Another liquid having a different index of refraction, such as distilled water, is supplied through the filling tube 54 to fill the remaining volume within the outer container. As explained herein in connection with the previous embodiment, the two liquid systems may be pressurized to prevent cavitation effects and to avoid high constant unbalanced pressure on the thin membranes and the bimorph.

In operation, assume first that the bimorph crystal 35 flexes downward tending to decrease the pressure of the carbon disulfide above the crystal and to increase the pressure in the water filling the remaining volume within the container. This causes the narrow arches 38 of the supportting structure to collapse slightly thereby tilting the tops of the attached plates 37 toward one another. The liquids between the tilted plates act as prisms causing the incident light beam to bend downwards.

On the other hand, assume that the bimorph crystal 35 flexes upwards, tending to increase the pressure in the carbon disulfide and decrease the pressure in the water. The arched structures 38 tend to expand, moving the upper edges of the attached plates apart, as shown in exaggerated fashion by the dotted line of FIG. 6. The liquids in between the tilted plates 37 from prisms tending to deflect the light beam upwards, as shown.

This embodiment illustrated in FIGS. 4, 5 and 6 may be preferred in certain instances both because of the relative ease of assembly and because this construction is especially suited for the use of only a single bimorph crystal. The plates 37 and the supporting structure may be fabricated as a single unit by any conventional plastic or glass molding process, with the flat surfaces of the plate later being polished or otherwise treated to improve the transparent properties. However, in view of the fact that the total distance through the liquid between the bottom of the bimorph 35 to the upper arch sections 38 of the supporting structure is somewhat greater in this embodiment, the maximum frequency response will be somewhat lower than that obtained with the dual crystal arrangement of FIGS. 1, 2 and 3.

The two embodiments of a light deflection unit in accordance with the invention have been hereinabove described and illustrated as vertical deflection units wherein the plates have been oriented to tilt through a vertical angle in response to applied deflection voltages. It should however be understood that these units act as horizontal deflection units when reoriented by 90°. In the embodiment of FIGS. 1, 2 and 3, only the diaphragms need be reoriented to provide a horizontal deflection unit.

Figure 7:
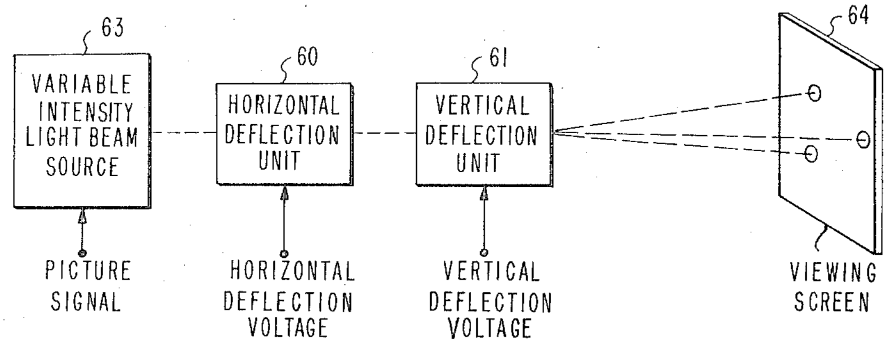
FIG. 7 is a schematic diagram illustrating an arrangement in accordance with the invention for deflecting a light beam in accordance with horizontal and vertical deflection voltages, such as may be used for oscilloscope and television applications.

Referring now to the schematic illustration of FIG. 7, a simple oscilloscope or television picture viewing system may be provided by combining a horizontal deflection unit 60 with a vertical deflection unit 61. A narrow light beam obtained from a variable intensity light beam source 63 is directed through both the horizontal and vertical deflection units 60, 61 toward a viewing screen 64. The viewing screen 64 may simply be a flat plate consisting of any suitable translucent or opaque light diffusing material. Preferably, the viewing screen will have a concave shape corresponding to that presently employed for television and oscilloscope tubes of the cathode-ray variety, and may also contain a coating of phosphorous material which would give a finite glow time to aid viewing.

The horizontal and vertical deflection units 60, 61 operate to position the beam on the viewing screen 64 in response to horizontal and vertical deflection voltages. As shown in FIG. 7, the beam from the source 63 first passes through the horizontal deflection unit 60 and then through the vertical deflection unit 61. The exit window of the horizontal deflection unit 60 should be placed in close proximity to the entrance window of the vertical deflection unit 61, so that the overall length of the combined deflection unit is kept to a minimum. Otherwise, certain problems arise in keeping the deflected beam within the dimensions of the last plate through which it passes, since with a given angle of displacement the total linear displacement from the center of the plate will be directly proportional to the total distance of beam travel.

Depending upon the intended use of the combined deflection unit, certain advantages are achieved when a selected one of the deflection units is placed ahead of the other. Generally, the deflection unit expected to operate at the higher frequency is placed first in the combined unit since the higher frequencies require smaller transverse dimensions of the unit for proper frequency response. Obviously, the total linear deflection of the beam within the first unit will be less than that in the second unit. Accordingly, the horizontal deflection unit 60 would normally be placed before the vertical deflection unit 61 in a television type system since the horizontal deflection frequencies are much higher than the vertical deflection frequencies. On the other hand, an oscilloscope usually employs a horizontal time base, which in many instances is at a much lower frequency than the signal frequencies that would be applied to the vertical deflection unit. In this case, the vertical deflection unit 61 would therefore be placed before the horizontal deflection unit 60 so that its plates may have larger dimensions without affecting the frequency response of the combined unit. In addition, it should be understood that the beam from the source 63 would normally have a fixed intensity when used for an oscilloscope, whereas the beam intensity is modulated by a picture signal for television.

While a combined light beam deflection unit offers many advantages over present black-and-white television and oscilloscope systems having cathode-ray tubes, even greater advantages are obtained from the use of such a light beam deflection unit for color television, as previously mentioned herein.

Several different color television systems in accordance with the invention will be hereinafter described and illustrated schematically in connection with FIGS. 8, 9, 10 and 11. Briefly, each of these embodiments contains means for generating three different primary colored light beams which are modulated in intensity in accordance with conventional color signals (red, blue and green, in accordance with present standards). The three beams are then projected in parallel beams in very close proximity through the horizontal and vertical deflection units 60 and 61 to impinge upon the diffusing surface of a viewing screen. The three embodiments differ only in the manner in which the three light beams are generated and modulated in intensity.

Figure 8:
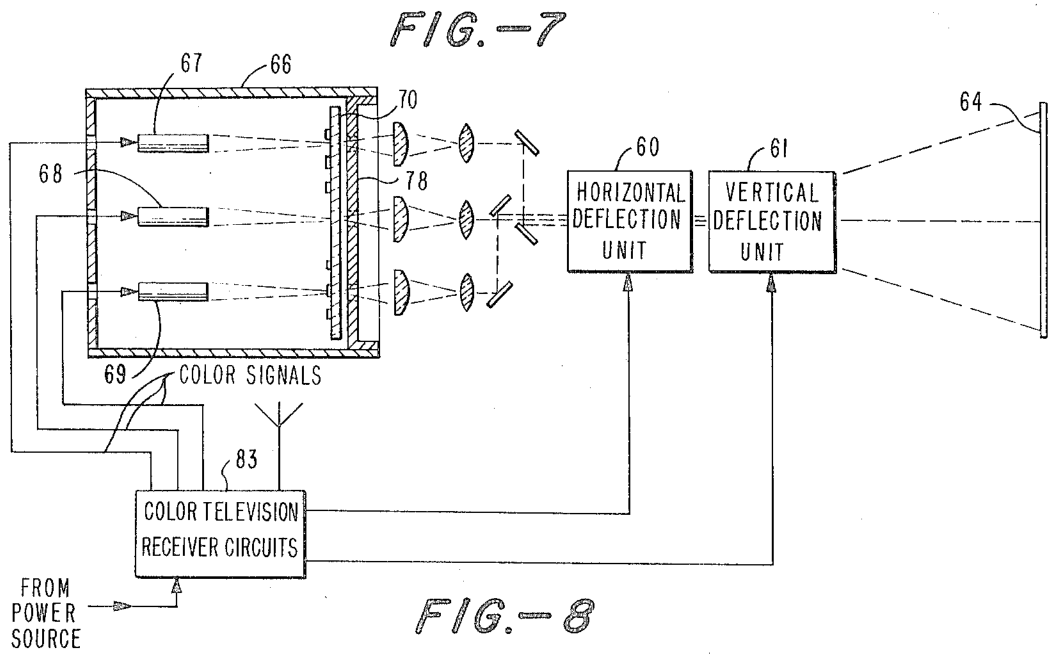
FIG. 8 is a schematic diagram, shown partially in section, illustrating one form of a color television device in accordance with the invention.
Figure 9:
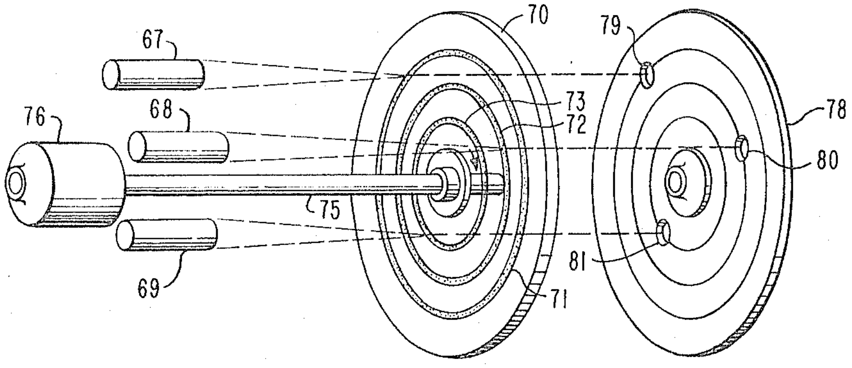
FIG. 9 is a partially exploded perspective view illustrating certain elements of the color television device of FIG. 8.

Referring now to FIGS. 8 and 9, there is shown a device for generating the three modulated color beams by means of a simple cathode-ray system. A cathode-ray tube enclosure 66 contains three electron guns 67, 68 and 69 mounted within to direct electron beams towards three selected spots on a rotating glass disk 70. The rotating glass disk 70 has concentric rings 71, 72 and 73 of red, yellow and blue phosphors, respectively, deposited on its inner surface, and is coupled by means of a shaft 75 to be rotated at a fixed speed by a motor 76, as shown in FIG. 9.

Each electron gun 67, 68 and 69 is independently aligned and focused to direct its electron beam toward a spot on the rotating glass ring 70 which has a radial position corresponding to the radius of a respective one of the phosphor rings 71, 72 and 73. The face of the cathode-ray tube 66 closely adjacent the opposite side of the rotating glass disk 70 consists of a metal wall 78 containing three small windows 79, 80 and 81 located directly opposite each of the electron spots. The red, yellow or blue light resulting from the electron beam striking each phosphor ring passes through the respective window 79, 80 or 81 to be focused by collimating lens arrangements into a narrow beam. Two of the narrow beams may then be deflected by the dual mirror arrangement to be projected along parallel paths in close proximity to the third beam. All three beams then pass as a bunch through the horizontal and vertical beam deflection units 60 and 61 to be scanned across the viewing screen 64.

Each of the electron guns 67, 68 and 69 may be independently adjusted in the conventional manner by varying the biasing intensity and focusing voltages applied to the acceleration and focusing electrodes within (not shown). In this manner, each beam may be provided with a nominal intensity necessary for proper color blending. The intensity of the electron flow in the beam determines the total amount of light and the focus determines the concentration of light in each of the colored beams. In this manner, controls external to the cathode-ray tube 66 itself are used to obtain the best possible color balance and picture resolution on the screen surface.

Preferably, the electron guns 67, 68 and 69 are disposed within the cathode-ray tube 66 so that the electron spots impinge upon the disk surface at approximately equal angles from one another, that is, 120° apart. The motor 76 rotates the disk 70 at a speed sufficient to permit the heat generated at the disk surface by the electron beams to be dissipated thus preventing the phosphor rings from being damaged by overheating. Thus continuous operation over a long span of time presents no danger to the color producing phosphors, even when high intensity light output is being achieved.

Conventional color television receiver circuits 83 are employed for deriving the red, yellow and blue color signals and the horizontal and vertical deflection voltages from the composite color signal received. The color signals applied to the respective electron guns 67, 68 and 69 modulate the flow of electrons, thus varying the intensity of the different color beams reaching the viewing screen in much the same manner as in conventional television sets.

Figure 10:
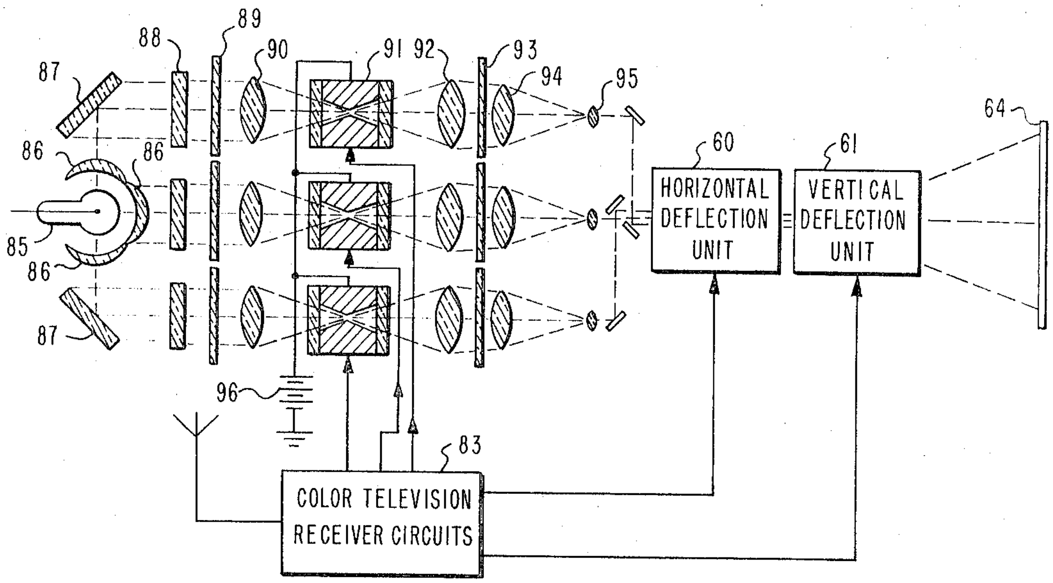
FIG. 10 illustrates schematically another form of a color television device in accordance with the invention.

Referring now to FIG. 10, a system is illustrated for generating the three modulated, different colored light beams from a single white light source 85, thereby avoiding use of any type of cathode-ray structure. The white light source 85 may be a conventional point source mercury arc lamp radiating intense white light. The white light emitted passes through three collimating lenses 86 in close proximity to emerge as three separate, relatively large diameter beams with light intensity corresponding to the desired color balance. Two of these broad beams are deflected by mirrors 87 to parallel the third beam. This light beam is then passed through filters 88 having the desired color before being polarized in, for example, the vertical direction by any conventional light polarizing means, which is shown herein as a sheet of light polarizing material 89. A concave lens 90 then focuses the vertically polarized light at a point corresponding to the longitudinal center point of Kerr cell device 91. The light emerging from the Kerr cell 91 is focused again into a beam of parallel light rays by a lens 92 to pass through an analyzer 93, which is another light polarizer having a horizontal axis of polarization, that is, an axis of polarization normal (90°) to that of the polarizer 89. The light which does pass through the analyzer 93 is optically focused by the lens 94 and a collimating lens 95 into a beam of the desired width for projection on the viewing screen 64.

As is well known in the art, a Kerr cell consists of a transparent insulator, such as carbon disulfide or nitrobenzine, that becomes doubly refracting when located in the strong electric field. Thus when placed to intercept a beam of plain polarized light between the polarizer and an analyzer, the light intensity emerging from the analyzer depends upon the degree of rotation of the plane of polarization resulting from the Kerr cell operation. The Kerr cells 91 employed herein have separate upper and lower metallic portions defining a wedge shaped interior containing the optically active material. A high voltage applied from a direct source 96 to the upper metallic portion of each cell 91 establishes a fixed electrical field across the dielectric material. This biasing electric field is modulated by the respective color signals, which are applied to the lower metallic portion after being generated in a conventional color television receiver circuit 83. Since the polarizers 89 and the respective analyzers 93 are polarized at 90° to each other, the intensity of the light beam passing therethrough to the horizontal and vertical deflection units 60 and 61 to impinge upon the screen 64 will be directly portional to the rotation of the plane of polarization produced in the intervening Kerr cell 91. The respective picture signals will have a negative polarity if the source 96 is of positive polarity so that the electric field across the dielectric produced by the color signal is additive with the biasing field. Accordingly, the intensity of each of the color beams can be made to correspond in direct proportion to the amplitude of the color signals derived from the composite TV signal received.

Figure 11:
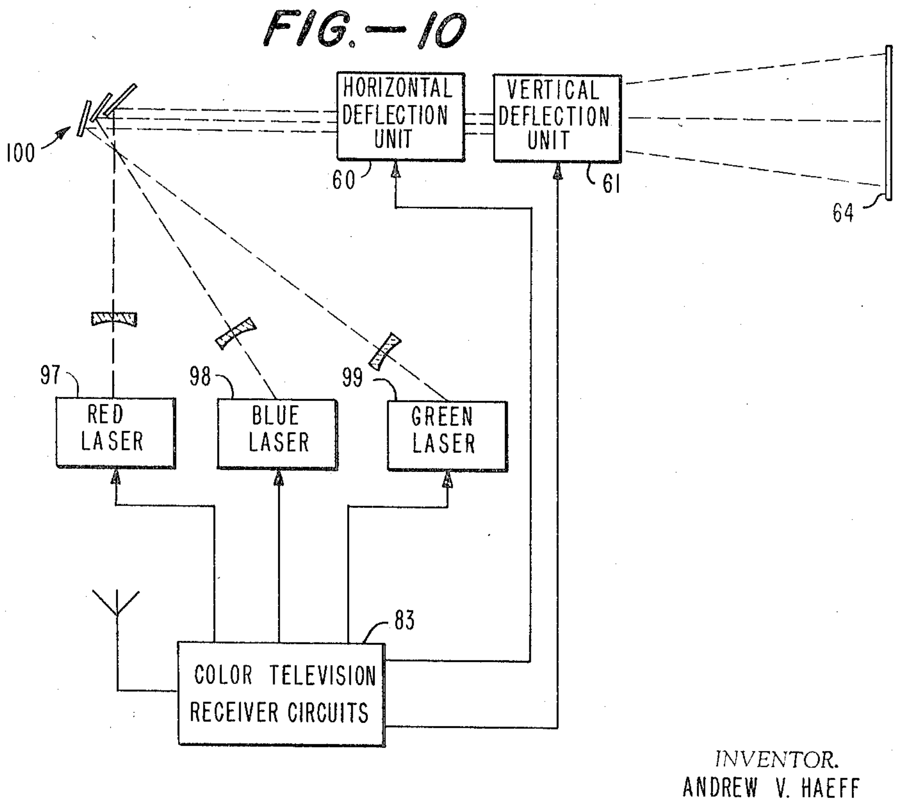
FIG. 11 illustrates schematically a further embodiment of a color television device in accordance with the invention.

Referring now to FIG. 11, there is shown an arrangement which takes advantage of the highly collimated, narrow beam of light which can be produced from presently available laser devices.

In accordance with this embodiment of the invention, three laser devices 97, 98 and 99 are employed to produce three narrow, highly collimated beams of essentially monochromatic red, blue and green light, to be projected on the viewing screen. Various laser devices are presently available which may be used for these purposes. For example, the red light beam may be produced by a conventional helium-neon gas laser and the green light from the mercury gas laser. Whereas most presently available gas laser devices operate in the infra-red and red regions of the frequency spectrum, there presently exist certain semiconductor lasers capable of producing laser radiation in almost any desired range of the color in the visible light spectrum. On the other hand, it is also possible to use three similar lasers, all operating in the red region of the spectrum, two of the lasers employing a conventional light frequency multiplying or shifting device using Raman effect for changing the red radiation to green and blue. Since the details of the laser devices and the frequency multiplier units used herewith are not necessary to an understanding of this invention, further discussion will be omitted for the sake of brevity.

The different color beams from the laser devices 97, 98 and 99 are directed toward a three mirror arrangement 100, in which the mirrors are oriented to reflect beams in parallel paths in close proximity with one another through the horizontal and vertical refracting units 60, 61 to the viewing screen 64. The intensity of the beam output from each laser is modulated by the red, blue and green color signals derived from a composite television signal by conventional color television receiver circuits 83. Effective laser modulation is obtained by using the color signals to vary the electric field excitation applied to the lasering material. As in the previous embodiments, the horizontal and vertical deflection units 60 and 61 operate in accordance with the vertical and horizontal deflection voltages also derived by the color television receiver circuits 83 from the transmitted composite television signal.

In each of the color television arrangements illustrated and described herein, the three different color light beams sweep across the surface of the viewing screen 64 in close proximity to one another or, if desired, may even be made to converge in a single moving spot on the screen surface. The picture sensed by the viewer appears complete because of the persistence of vision of the human eye at the scanning speeds used in conventional television systems.

The color dispersion effect associated with light refracted by a prism can, for the most part, be ignored if the total deflection angle is small. However, dispersion effects may cause some slight loss of true color and resolution at the edge of the television picture, but this may be almost wholly avoided by using liquids having compensating dispersion characteristics. In any event, the dispersion effect will be very slight since it depends upon the difference between the dispersion characteristics of the two liquids employed. However, should very sharp picture and color resolution be desired, even at the edges of the viewing screen, a separate combined vertical and horizontal beam deflection unit may be used for the beam of each color. The plates of these separate units may then be particularly tailored to deflect the different color beams to approximately the same spot on the viewing screen. This can best be accomplished by shaping the surfaces of the plates used in the deflection unit so that they compensate for the dispersion effects and the differences in the separate beam paths. The low cost of the additional deflection units may easily be justified by the greatly improved resolution.

It should be noted that each of the color television system embodiments illustrated and described herein are capable of compatible operation, that is, are entirely suitable for the reception of black-and-white television program material. As in conventional compatible color systems, the three colors are combined in correct proportions to yield a white effect, and all three beams are modulated in intensity by the same signal derived in the receiver's circuits. The different colors of the beams combine in such a manner that the overall effect on the eye of the viewer is comparable to that produced from the viewing screen as scanned by a single white light beam modulated in intensity.

Another feature to be noted is that a television system, either black-and-white or color, operating in accordance with the invention can be used to project the television picture onto an opaque viewing surface, such as a conventional movie screen or even a blank wall. Thus, the picture area may be increased or decreased, as in other projection systems, by simply varying the distance between the deflection unit and the viewing surface onto which the picture is projected. Furthermore, this avoids the necessity of providing a special viewing screen attached to the television set. Of course, it will be understood that the polarity of the horizontal scan signal may be reversed, if necessary, to produce the proper viewing relationship when the television pictures are projected onto an opaque screen, rather than being viewed through a translucent viewing screen as in present systems.

In an alternative arrangement, the beams used for scanning need not be in the visible light region of the spectrum. This is particularly advantageous when the television picture is projected onto the surface of a distant viewing screen, since the beams themselves will not then be visible even in a smoky or dusty room. For this purpose, of course, a special viewing screen is necessary. For example, one of the beams may be in the far ultra-violet, a second in the near ultra-violet, and the third in the infra-red region of the spectrum. The special projection screen would thus be coated with three different fluorescent phosphors which are selectively excited by the different types of radiation. A first phosphor would produce a blue fluorescent light when excited by the beam in the far ultra-violet, the second phosphor would produce a green light when excited by the beam in the near ultra-violet, and the third phosphor would produce a red fluorescent light when excited by the beam in the infra-red region of the spectrum.

Of course, it should be understood that any suitable phosphor and beam arrangement may be chosen to produce the desired result. The chosen phosphors are mixed and applied as a homogeneous coating on the surface of the viewing screen. The three beams are then deflected by the combined horizontal and vertical deflection units and intensity modulated in accordance with the derived color signals to produce a color television picture, or the black-and-white picture, as the case may be. Such an arrangement would be particularly useful with laser beam sources which cannot produce radiation frequencies corresponding to the primary colors needed to produce the desired visible color range.

Of course, the phosphor coating applied to the viewing screen should be protected from contamination. This may be done by applying a thin glass or other suitable inert translucent material, by spraying or otherwise, over the phosphor surface while in an inert atmosphere. Also, if desired, a glass plate or the like can be sealed over the phosphorized surface after the contaminating air has been removed from the space between the phosphor and the inside of the plate. After removing the air, the space between can be filled with an inert gas such as neon or xenon, for example.

While the invention has been particularly shown and described herein with reference to preferred embodiments thereof, it should be understood by those skilled in the art that various changes in the form and details may be made therein without departing from the spirit and scope of the invention as expressed in the appended claims.

What is claimed is:

1. A light beam deflection unit comprising: a plurality of prisms disposed along a selected beam path and consisting of a series of refractive interfaces defining the separations between adjacent volumes of transparent materials having different indices of refraction, ajacent interfaces forming prism angles which vary in response to an applied pressure; transducer means responsive to applied deflection signals for producing a volume displacement in proportion to an applied signal; and a substantially constant volume of liquid defining a fluid pressure path between said transducer means and said prisms, so that the volume displacements produced by the applied deflection signals are transmitted as pressure changes to said prisms to change the prism angle formed by adjacent interfaces, thereby deflecting a light beam from the selected beam path by an amount corresponding to the amplitude of the applied deflection signal.

2. A signal operated light beam deflection unit comprising: a series of prisms aligned along a selected beam path, each of said prisms consisting of first and second liquids having dissimilar indices of refraction and means defining an interface between successive volumes containing different ones of said two fluids, each portion of the interface defining means through which the light beam passes having a rigid predetermined shape and the portions of said interface defining means adjacent the rigid portions being flexible to permit variations in the angular relationship between adjacent rigid portions; and transducer means responsive to applied electrical signal for producing a pressure differential between the two liquids on either side of the interface defining means, said two liquids being confined in substantially constant volumes between the transducer means and the interface defining means, whereby a light beam passing through the two liquid volumes and through the rigid portions of said interface defining means is deflected in accordance with the angular relationship between adjacent rigid portions of the interface defining means in accordance with the amplitude and polarity of the electric signal applied to the transducer means.

3. A signal controlled light beam deflection circuit comprising: two liquids having dissimilar indices of refraction; means confining the two liquids in separate substantially constant volumes, a portion of said confining means consisting of a series of rigid sections of a transparent material aligned along a selected beam path, each rigid transparent section defining an interface between the two liquids; means flexibly supporting the rigid sections to permit variations in the angular relationship between adjacent rigid sections in the series in response to pressure differentials between the two liquid volumes; and transducer means responsive to the amplitude and polarity of applied electrical signals for producing a pressure differential between the two liquid volumes, whereby the shape of the volume of liquid between two adjacent rigid sections causes a light beam passing therethrough to be deflected from the selected beam path in accordance with the applied electrical signal.

4. A signal operated light beam deflection unit comprising: first and second liquids having dissimilar indices of refraction; a plurality of transparent rigid plates disposed substantially parallel to one another and aligned along a selected light beam path; means flexibly supporting said plates in a manner to permit predetermined angular variations between adjacent plates relative to the beam path, said supporting means and said plates defining an interface separation between the first and second liquids to form two liquid volumes so that the spaces between successive pairs of adjacent plates are filled with different ones of the two liquids; and transducer means responsive to applied electrical signals for producing pressure differentials between the two liquid volumes to vary the angular relationship between adjacent plates, whereby the incident light beam is deflected from the given path by the refraction of the beam as it passes through the transparent plates from one liquid to the other.

5. The light beam deflection unit of claim 4 wherein said transducer means consists of a piezoelectric crystal device confining the two liquids in separate substantially constant liquid volumes, said piezoelectric crystal device flexing in a manner tending to increase the pressure in one liquid volume while tending to decrease the pressure in the other liquid volume.

6. The light beam deflection unit of claim 4 wherein said supporting means includes flexible arches coupled between alternate adjacent pairs of said plates along at least one edge of said plates to be expanded and contracted by the pressure differentials between the two liquid volumes to move said one edges of said alternate adjacent pairs of plates away from and toward one another, and flexible means pivotally attaching the opposite edges of the other adjacent pairs of said plates not coupled by said arches to one another along the edges opposite said one edge so that the flexible arches are expanded and contracted to vary the angular relationship of adjacent pairs of said plates.

7. The light beam deflection unit of claim 6 wherein said transducer means comprises a single bimorph crystal of essentially flat configuration, said bimorph crystal being disposed between the two liquid volumes to confine an inner substantially constant volume of the first liquid between the interface separation and one surface of the bimorph crystal and to confine an outer substantially constant volume of the second liquid between the other surface of the bimorph crystal and said interface separation, said outer volume surrounding said inner volume, said bimorph crystal being responsive to the applied electrical signals for flexing to produce a pressure differential between said outer and inner volumes causing variations in the angular relationships of adjacent plates.

8. The deflection unit of claim 4 wherein said supporting means consists of separate flexible diaphragms, each having one of said plates attached thereto, said plates being uniformly displaced from the center point of the diaphragms, spacer elements, each being disposed between an adjacent pair of said diaphragms and having a central openings surrounding a respective one of said plates to define a portion of one of said two liquid volumes and to permit flexing of the diaphragms, the pair of spacer elements on opposite sides of each diaphragm having pressure holes disposed therein to communicate with different ones of said two liquid volumes so that the spaces between successive pairs of adjacent diaphragms are filled with different ones of said first and second liquids.

9. The light beam deflection unit of claim 8 wherein said transducer means consists of first and second bimorph crystal devices having interior flat surfaces communicating with respective ones of the two liquid volumes, said bimorph crystal devices responding to applied electrical signals to flex in opposite directions with respect to the two liquid volumes, so that a pressure differential is produced across said flexible diaphragms through said pressure holes.

10. The light beam deflection unit of claim 9 further comprising a third liquid volume and a rigid container means for confining said third liquid volume in a substantially constant volume, said third liquid volume communicating with the exterior faces of the two bimorph crystal devices to provide positive coupling between the exterior faces of the crystal devices through said third liquid volume.

11. A light beam deflection unit comprising: two liquids having dissimilar indices of refraction confined in separate substantially constant volumes; flexible means defining successive interfaces along a selected beam path between alternate prism shaped volumes of the two liquids; and transducer means responsive to an applied signal for producing a pressure differential in the two liquid volumes across said flexible interface defining means to vary the angular relationship between adjacent interfaces, thereby changing the prism angle of the prism shaped volumes to deflect the light beam from the selected beam path through an angle proportional to the applied signal.

12. A light beam scanning device comprising: first and second light beam deflection units disposed along a selected beam path, each of said light beam deflection units including two liquids having dissimilar indices of refraction and confined in separate substantially constant volumes, flexible means defining successive interfaces along the selected beam path between alternate prism shaped volumes of the two liquids, and transducer means responsive to an applied signal for applying a pressure differential to the two liquid volumes across said flexible interface defining means to vary the angular relationship between adjacent interfaces and thereby change the prism angle of the prism shaped volumes to deflect an incident light beam from the selected beam path through an angle proportional to the applied signal, said first light beam deflection unit being arranged to deflect the incident light beam from the selected beam path in a first direction and said second light beam deflection unit being arranged to deflect the incident light beam from the selected beam path in a second direction, said first and second directions being approximately normal to each other and to the selected beam path; and means for generating first and second deflection signals for separate application to the transducers in said first and second beam deflection units to cause the incident beam to be deflected in a regular pattern to scan an area with a light spot.

13. A device for visually presenting television programs comprising: television receiver circuits for providing picture signals along with horizontal and vertical deflection signals; means providing at least one beam of light, said light beam means being responsive to the picture signals to modulate the intensity of the light beam; horizontal and vertical light beam deflection units, each of said light beam deflection units including two liquids having dissimilar indices of refraction confined in separate substantially constant volumes, flexible means defining successive interfaces along the path of said light beam between alternate prism shaped volumes of the two liquids, and transducer means responsive to the applied deflection signal for producing a pressure differential in the two liquid volumes across said flexible interface defining means to vary the angular relationship between adjacent interfaces to thereby change the prism angle of the prism shaped volumes and thus deflect the light beam from a selected beam path through an angle proportional to the amplitude of the applied deflection signal, said first light beam deflection unit being responsive to the horizontal deflection voltages from the television receiver circuits and said second light beam deflection unit being responsive to the vertical deflection voltages, whereby said light beam scans a viewing surface in a regular pattern in response to the vertical and horizontal deflection voltages thus presenting a television program in accordance with the picture signals from the television receiver circuits.

14. The device of claim 13 further including a translucent viewing screen disposed in the light beam path to be scanned on the side opposite the viewing surface.

15. The device of claim 13 further including an opaque viewing surface disposed in the path of said light beam to be scanned by the light beam on the viewing surface.

16. A color television device comprising: a viewing screen; color television receiver circuits for providing three primary color signals and vertical and horizontal deflection signals; means responsive to the color signals for providing three primary colored light beams modulated in intensity by the corresponding color signal and directed in substantially parallel paths in close proximity to one another for scanning a viewing surface; horizontal and vertical light beam deflection units, each of said light beam deflection units including two liquids having dissimilar indices of refraction confined in separate substantially constant volumes, flexible means defining successive interfaces along the path of said light beams between alternate prism shaped volumes of the two liquids, and transducer means responsive to the applied deflection signal for producing a pressure differential in the two liquid volumes across said flexible interface defining means to vary the angular relationship between adjacent interfaces to thereby change the prism angle of the prism shaped volumes of liquid and thus deflect the light beam from a selected beam path through an angle proportional to the amplitude of the applied deflection signal, said first light beam deflection unit being responsive to the horizontal deflection voltages from the colored television receiver circuit and said second light beam deflection unit being responsive to the vertical deflection voltages, whereby said light beams are deflected to scan the viewing surface in a regular pattern in response to the vertical and horizontal deflection voltages, thus presenting a color television program in accordance with the color signals from the color television receiver circuits.

17. The colored television device of claim 16 wherein said means for providing the beams of light comprises: a cathode-ray tube including three electron guns responsive to respective ones of the three primary color signals to produce a modulated electron beam, and means for providing three phosphor materials responsive to the electron beams, each electron gun being focused on a different phospohr to produce a separate primary colored light of variable intensity; and means for focusing the three primary colored lights into three beams substantially in parallel and in close proximity to one another.

18. The colored television device of claim 16 wherein the means for providing the three primary colored light beams comprises: a source of white light; means for focusing the white light in three separate light beam paths; color filter means disposed in each of said three light beam paths to produce three light beams, each beam having one of the three primary colors; and Kerr cell means disposed in each of said three light beam paths and operative responsive to a respective one of said color signals for separately modulating the intensity of the colored light in each path.

19. The colored television device of claim 16 wherein said light beam producing means consists of three laser devices for producing highly collimated narrow beams of coherent light, each beam having one of said primary colors; and means for deflecting said narrow beams into paths substantially parallel and in close proximity to one another.

20. A color television device comprising: color television receiver circuits for providing three primary color signals and horizontal and vertical deflection signals; means providing three narrow beams of radiation, each beam containing radiation having a distinct frequency in the order of the frequency of visible light, said beam providing means being responsive to the color signals from the color television receiver circuits to modulate the radiation intensity of each beam; horizontal and vertical beam deflection units, each of said beam deflection units including two liquids having dissimilar indices of refraction confined in separate substantially constant volumes, flexible means defining successive interfaces along the path of said light beam between alternate prism shaped volumes of the two liquids, and transducer means responsive to the applied deflection signal for producing a pressure differential in the two liquid volumes across said flexible interface defining means to vary the angular relationship between adjacent interfaces to thereby change the prism angle of the prism shaped volumes and thus deflect the light beam from a selected beam path through an angle proportional to the amplitude of the applied deflection voltage, said first light beam deflection unit being responsive to the horizontal deflection voltages from the television receiver circuits and said second light beam deflection unit being responsive to the vertical deflection voltages; a viewing surface; and a phosphor coating applied to said viewing surface to be scanned by the three beams, said phosphor coating including three different phosphor materials, each being independently responsive to the radiation frequency of one of said beams to produce one of three primary colors having an intensity proportional to the respective color signal and the radiation intensity in the respective beam.

References Cited by the Examiner

UNITED STATES PATENTS

| | | | |
|---|---|---|---|
| 1,770,535 | 7/1930 | Sukumlyn | 88—61 |
| 2,226,508 | 12/1940 | Clothier et al. | 178—5.1 |
| 2,557,974 | 6/1951 | Kibler | 88—61 |
| 2,990,449 | 6/1961 | Valensi | 178—5.4 |

References Cited by the Applicant

UNITED STATES PATENTS

| | | |
|---|---|---|
| 634,560 | 10/1899 | Lumiere. |
| 683,164 | 9/1901 | Widean. |
| 1,269,422 | 6/1918 | Gordon. |
| 1,515,389 | 11/1924 | Hopkins. |
| 1,782,328 | 11/1930 | Wearham. |
| 2,269,905 | 1/1942 | Graham. |
| 2,300,251 | 10/1942 | Flint. |
| 2,525,921 | 10/1950 | Madan et al. |
| 2,836,101 | 5/1958 | De Swart. |
| 3,161,718 | 12/1964 | De Luca. |

FOREIGN PATENTS

| | | |
|---|---|---|
| 520,933 | 3/1955 | Italy. |

DAVID G. REDINBAUGH, *Primary Examiner.*

J. H. SCOTT, J. A. O'BRIEN, *Assistant Examiners.*